United States Patent
Yokoyama (10) Patent No.: US 9,601,735 B2
(45) Date of Patent: Mar. 21, 2017

(54) CYLINDRICAL BATTERY

(75) Inventor: Tomohiko Yokoyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 511 days.

(21) Appl. No.: 12/992,240

(22) PCT Filed: Feb. 22, 2010

(86) PCT No.: PCT/JP2010/001117
§ 371 (c)(1),
(2), (4) Date: Nov. 11, 2010

(87) PCT Pub. No.: WO2010/116590
PCT Pub. Date: Oct. 14, 2010

(65) Prior Publication Data
US 2011/0064979 A1    Mar. 17, 2011

(30) Foreign Application Priority Data
Apr. 10, 2009   (JP) ................. 2009-096226

(51) Int. Cl.
H01M 2/12      (2006.01)
H01M 2/04      (2006.01)
H01M 10/0525   (2010.01)

(52) U.S. Cl.
CPC ....... *H01M 2/1241* (2013.01); *H01M 2/0413* (2013.01); *H01M 10/0525* (2013.01); *Y02E 60/122* (2013.01); *Y02T 10/7011* (2013.01)

(58) Field of Classification Search
None
See application file for complete search history.

(56) References Cited

U.S. PATENT DOCUMENTS 5,853,912 A    12/1998  Naing et al.
2007/0009785 A1*  1/2007  Kozuki et al. .............. 429/53

FOREIGN PATENT DOCUMENTS

| JP | 06-187957 | | 7/1994 |
|---|---|---|---|
| JP | 09-274900 | | 10/1997 |
| JP | 09274900 A | * | 10/1997 |
| JP | 10-064499 | | 3/1998 |
| JP | 10-092407 | | 4/1998 |
| JP | 10092407 A | * | 4/1998 |
| JP | H10-092409 A | | 4/1998 |

(Continued)

OTHER PUBLICATIONS

Japanese Office Action issued in Japanese Patent Application No. 2009-096226 mailed Nov. 21, 2013.

*Primary Examiner* — Daniel Gatewood
(74) *Attorney, Agent, or Firm* — McDermott Will & Emery LLP (57) ABSTRACT

The opening of a cylindrical battery case 1 with a bottom is sealed by a seal assembly 5. The seal assembly 5 has an upper valve plate 13, a lower valve plate 15, and a bottom plate 16. The bottom plate 16 has inner gas vent holes 21. When the inner gas vent holes 21 are viewed from the axial direction of the battery case 1, at least a part of each inner gas vent hole 21 overlaps a valve-hole forming portion 15b of the lower valve plate 15. With this configuration, for example, even when an electrode assembly 20 is pushed up by increased internal pressure of the battery to push up the bottom plate 16, the valve hole is not closed.

6 Claims, 6 Drawing Sheets

(56) References Cited

FOREIGN PATENT DOCUMENTS

| JP | 2000-149918 A | | 5/2000 |
|---|---|---|---|
| JP | 2004-241308 | | 8/2004 |
| JP | 2004241308 A | * | 8/2004 |
| JP | 2007-018962 | | 1/2007 |
| JP | 2009-016079 | | 1/2009 |

* cited by examiner

FIG. 6 ured States Patent

CYLINDRICAL BATTERY

RELATED APPLICATIONS

This application is the U.S. National Phase under 35 U.S.C. §371 of International Application No. PCT/JP2010/001117, filed on Feb. 22, 2010, which in turn claims the benefit of Japanese Application No. 2009-096226, filed on Apr. 10, 2009, the disclosures of which Applications are incorporated by reference herein.

TECHNICAL FIELD

The invention relates to cylindrical batteries, and more particularly, to an improvement in the seal structure for improving the safety of cylindrical batteries.

BACKGROUND ART

Cylindrical batteries usually have a cylindrical metal battery case with a bottom for housing a power generating element. The opening of the battery case is sealed by a metal seal plate or seal assembly.

The seal assembly has a valve mechanism for securing battery safety. In the event that an abnormal condition occurs in the battery and the internal pressure of the battery case increases to a predetermined value or more, the valve mechanism is actuated, thereby causing the gas inside the battery case to be released. This prevents the battery case from becoming cracked or the like.

Figure 6:
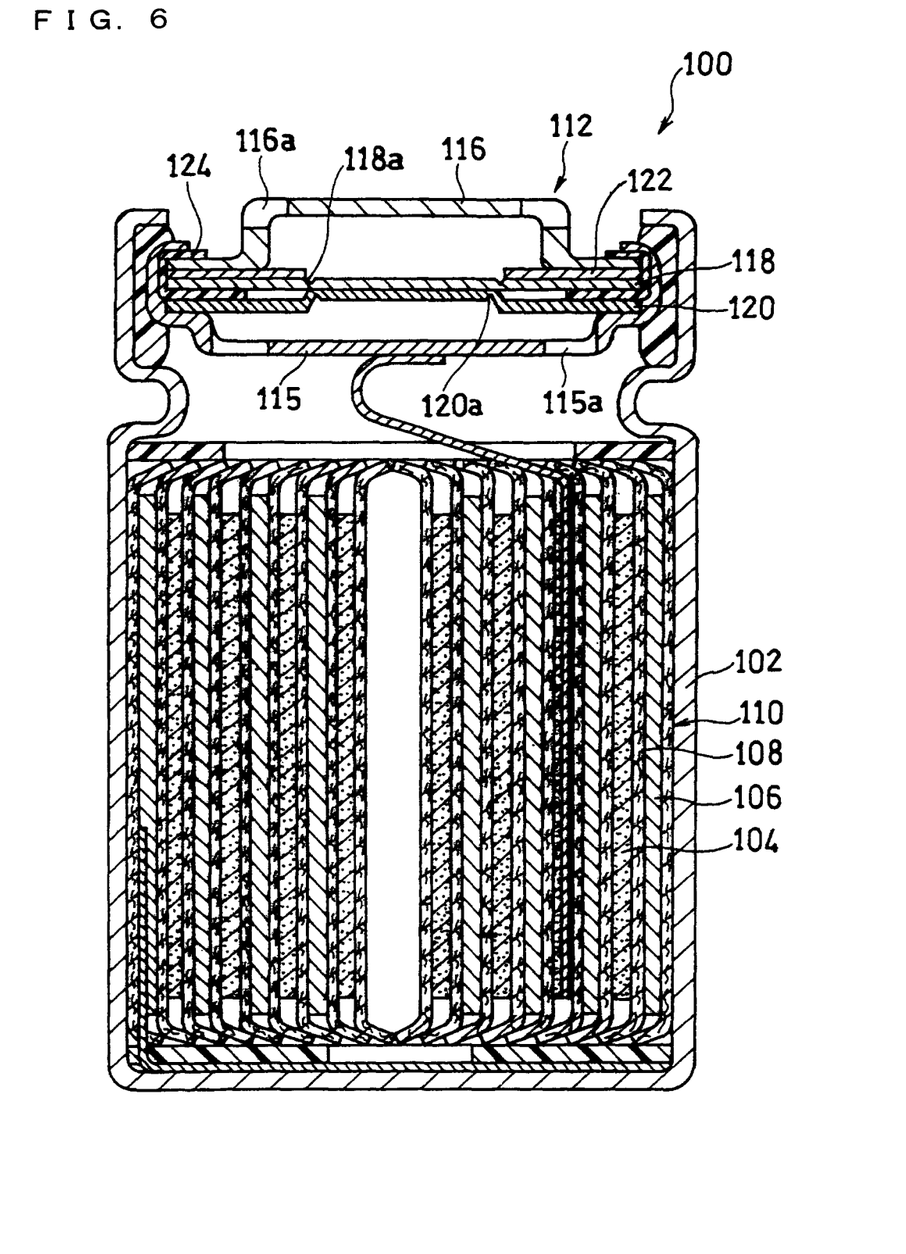
FIG. 6 is a sectional view schematically showing the structure of a conventional cylindrical battery.

FIG. 6 illustrates an example of a conventional cylindrical battery. A battery 100 is a lithium ion secondary battery, and a battery case 102 contains an electrode assembly 110 which is obtained by spirally winding a positive electrode 104 and a negative electrode 106, with a separator 108 interposed therebetween. The opening of the battery case 102 is sealed by a seal assembly 112.

The seal assembly 112 has a bottom plate 115 at the lowest part and has an external terminal plate 116 at the highest part. Between them are an upper valve plate 118, a lower valve plate 120, an annular PTC thermistor plate 122, and an annular insulating member 124. The upper valve plate 118 and the lower valve plate 120 have annular fragile portions 118a and 120a, respectively, so that when the internal pressure of the battery case 102 increases abnormally, a valve hole is formed in the center. Also, the bottom plate 115 of the seal assembly 112 has a plurality of gas vent holes 115a near the edge thereof. The external terminal plate 116 also has a plurality of gas vent holes 116a.

With this configuration, when the internal pressure of the battery case 102 increases abnormally, the fragile portions 118a and 120a of the upper valve plate 118 and the lower valve plate 120 rupture, thereby creating a valve hole through which the gas inside the battery case 102 is released to the outside.

However, with the recent increase in the functionality of electronic devices, the capacities of batteries are also becoming increasingly higher. As a result, when an abnormal condition occurs in lithium ion secondary batteries, the amount of increase in the internal pressure of the battery case is also becoming increasingly larger. To address this problem, various proposals have been made on techniques for ensuring battery safety.

For example, PTL 1 proposes setting the area of gas vent holes of a seal member to 0.15 to 1.2 cm$^2$ per battery capacity (Ah), in order to prevent explosion or ignition due to a sharp increase in the internal pressure of a non-aqueous electrolyte battery.

CITATION LIST

Patent Literature

[PTL 1] Japanese Laid-Open Patent Publication No. Hei 6-187957

SUMMARY OF INVENTION

Technical Problem

However, in the conventional cylindrical battery illustrated in FIG. 6, when the internal pressure of the battery case 102 increases abnormally, for example, the electrode assembly 110 may be pushed up, thereby pushing up the bottom plate 115 at the lowest part of the seal assembly 112 and pressing it against the lower valve plate 120. In such cases, the valve hole formed by rupture of the fragile portions 118a and 120a of the upper valve plate 118 and the lower valve plate 120 may be closed by the bottom plate 115, so that the gas inside the battery case 102 may not be promptly released.

The invention is achieved in view of the above-noted problem. An object of the invention is to prevent the valve hole formed by a safety valve in the seal portion of a battery case upon an abnormal increase in the internal pressure of the battery case from being closed by another member, i.e., malfunctioning of the safety vent.

Solution to Problem

The invention provides a cylindrical battery including: a power generating element; a cylindrical battery case with a bottom for housing the power generating element; and a seal assembly for sealing an opening of the battery case. The seal assembly includes a terminal plate with an outer gas vent hole, a bottom plate with an inner gas vent hole, and at least one valve plate disposed between the terminal plate and the valve plate. The terminal plate and the bottom plate are electrically connected via the valve plate. The valve plate has a fragile portion which will rupture when the internal pressure of the battery increases so that a valve hole is formed in the valve plate. The seal assembly further includes a closure prevention mechanism for preventing the valve hole from being closed by the bottom plate when the bottom plate is pressed against the valve plate.

Advantageous Effects of Invention

In the event that the internal pressure of a battery increases abnormally, for example, even when the power generating element is pushed up to press the bottom plate of the seal assembly against the valve plate, the closure prevention mechanism of the invention prevents the valve hole formed in the valve plate upon an increase in the internal pressure of the battery from being closed by the bottom plate. This mechanism allows the gas inside the case to be released more reliably upon an abnormal increase in the internal pressure of the battery, thereby making it possible to improve the safety of the cylindrical battery.

DESCRIPTION OF EMBODIMENTS

Embodiment 1

With reference to drawings, Embodiments of the invention are described in details.

Figure 1:
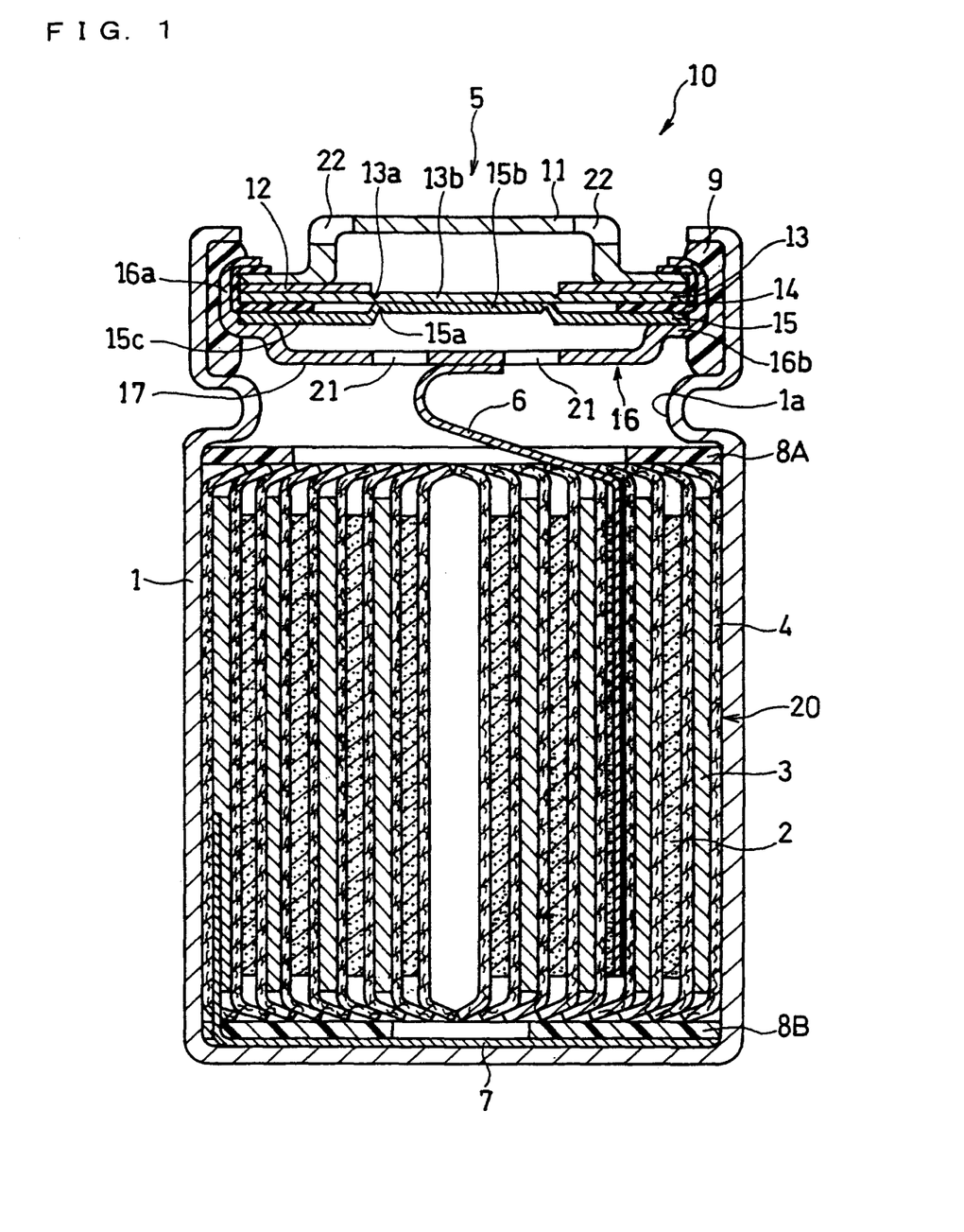
FIG. 1 is a sectional view schematically showing the structure of a cylindrical battery according to Embodiment 1 of the invention.

FIG. 1 is a sectional view schematically showing the structure of a cylindrical battery according to an embodiment of the invention. A battery 10 illustrated therein is a cylindrical lithium ion secondary battery, and includes an electrode assembly 20 produced by spirally winding a positive electrode 2, a negative electrode 3, and a separator 4 interposed therebetween. The electrode assembly 20 and a non-aqueous electrolyte (not shown) are housed in a battery case 1, which is a metal cylinder with a bottom. The opening of the battery case 1 is sealed by a seal assembly 5, so that the electrode assembly 20 and the non-aqueous electrolyte are sealed in the battery case 1. Inside the battery case 1, an upper insulator plate 8A and a lower insulator plate 8B are fitted to the upper and lower parts of the electrode assembly 20, respectively.

The seal assembly 5 is composed of a hat-shaped terminal plate 11, an annular PTC (positive temperature coefficient) thermistor plate 12, a disc-shaped upper valve plate 13, a disc-shaped lower valve plate 15, all of which are made of a conductive material, an annular gasket 14 for the assembly, which is made of an insulating material, and a bottom plate 16. The bottom plate 16 includes a bottom portion 17 disposed at the lowest part of the seal assembly 5, a cylindrical portion 16a, and a connecting portion 16b connecting the bottom portion 17 and the cylindrical portion 16a.

The bottom portion 17 is circular, and the connecting portion 16b is raised from the circumference of the bottom portion 17. A flat portion extends continuously from the upper raised end of the connecting portion 16b, and the cylindrical portion 16a is raised from the end of the flat portion. The lower valve plate 15 is mounted on the flat portion of the connecting portion 16b.

The gasket 14 for the assembly is fitted between the peripheral portion of the upper valve plate 13 and the peripheral portion of the lower valve plate 15 to prevent contact between the peripheral portion of the upper valve plate 13 and the peripheral portion of the lower valve plate 15. Also, the gasket 14 for the assembly is interposed between the cylindrical portion 16a of the bottom plate 16 and the edge of the terminal plate 11 to prevent direct contact therebetween.

The edge of the seal assembly is fitted with an insulating gasket 9 between the cylindrical portion 16a of the bottom plate 16 and the opening of the battery case 1. The gasket 9 seals the gap between the seal assembly 5 and the battery case 1 while insulating them.

The terminal plate 11 and the PTC thermistor plate 12 are in contact with each other at their peripheral portions. The PTC thermistor plate 12 and the upper valve plate 13 are in contact with each other at their peripheral portions. The upper valve plate 13 and the lower valve plate 15 are in contact with each other at their central portions. The central portion of the upper valve plate 13 and the central portion of the lower valve plate 15 are welded to each other. The lower valve plate 15 and the bottom plate 16 are in contact with each other at the peripheral portion of the lower valve plate 15 and the connecting portion 16b and the cylindrical portion 16a of the bottom plate 16. With this configuration, the terminal plate 11 and the bottom plate 16 are electrically connected to each other via the PTC thermistor plate 12 and the central contact portion of the upper valve plate 13 and the lower valve plate 15.

The bottom portion 17 is electrically connected to the positive electrode 2 via a positive electrode lead 6. As a result, the terminal plate 11 is electrically connected to the positive electrode 2, so that it serves as the external positive terminal of the battery 10. The battery case 1 is electrically connected to the negative electrode 3 via a negative electrode lead 7, so that it functions as the external negative terminal of the battery 10.

When an excessive current flows through the battery 10 for some reason, the temperature of the PTC thermistor plate 12 increases, and the electrical resistance of the PTC thermistor plate 12 increases. As a result, the current is suppressed or shut-off, thereby preventing an excessive current from flowing through the battery 10. Also, as described below, when the internal pressure of the battery increases abnormally, a valve hole is formed in the central portion of the upper valve plate 13 and the lower valve plate 15, so that the contact portion of the upper valve plate 13 and the lower valve plate 15 disappears. As a result, the electrical connection between the terminal plate 11 and the bottom plate 16 is severed.

The outer edge of the gasket 14 for the assembly protrudes further upward from the upper end of the cylindrical portion 16a of the bottom plate 16. In this state, by bending and crimping the upper end of the cylindrical portion 16a inward, the terminal plate 11, the PTC thermistor plate 12, the upper valve plate 13, the gasket 14 for the assembly, and the lower valve plate 15 are secured to the bottom plate 16. At this time, the edges of the terminal plate 11, the PTC thermistor plate 12, and the upper valve plate 13 are separated from the cylindrical portion 16a by the gasket 14 for the assembly so that they do not come into contact with the cylindrical portion 16a.

The terminal plate 11 of the seal assembly 5 has outer gas vent holes 22. The bottom plate 16 of the seal assembly 5 also has inner gas vent holes 21.

The upper valve plate 13 is circular, and the upper valve plate 13 has, at the center, a fragile portion 13a which is an annular groove concentric with the circular upper valve plate 13. The portion surrounded by the fragile portion 13a is a portion (valve-hole forming portion) 13b in which a valve hole is to be formed when the fragile portion 13a ruptures.

The lower valve plate 15 is also circular, and has, at the center, a fragile portion 15a which is an annular groove concentric with the circular lower valve plate 15. The portion surrounded by the fragile portion 15a is a portion (valve-hole forming portion) 15b in which a valve hole is to be formed when the fragile portion 15a ruptures.

The diameter of the fragile portion 15a of the lower valve plate 15 is slightly smaller than the diameter of the fragile portion 13a of the upper valve plate 13. As a result, the valve-hole forming portion 15b of the lower valve plate 15 entirely overlaps the valve-hole forming portion 13b of the upper valve plate 13. Hence, when the internal pressure of the battery increases abnormally and the fragile portion 13a of the upper valve plate 13 and the fragile portion 15a of the lower valve plate 15 rupture, it is possible to prevent the valve-hole forming portion 15b of the lower valve plate 15 from closing the valve hole formed in the upper valve plate 13.

Further, for the same reason, the diameter of the central opening of the PTC thermistor plate 12 is slightly larger than the diameter of the valve-hole forming portion 13b of the upper valve plate 13, and the valve-hole forming portion 13b of the upper valve plate 13 entirely overlaps the central opening of the PTC thermistor plate 12. Likewise, the diameter of the central opening of the gasket 14 for the assembly is larger than the diameter of the central opening of the PTC thermistor plate 12, and the central opening of the PTC thermistor plate 12 entirely overlaps the central opening of the gasket 14 for the assembly.

Figure 2:
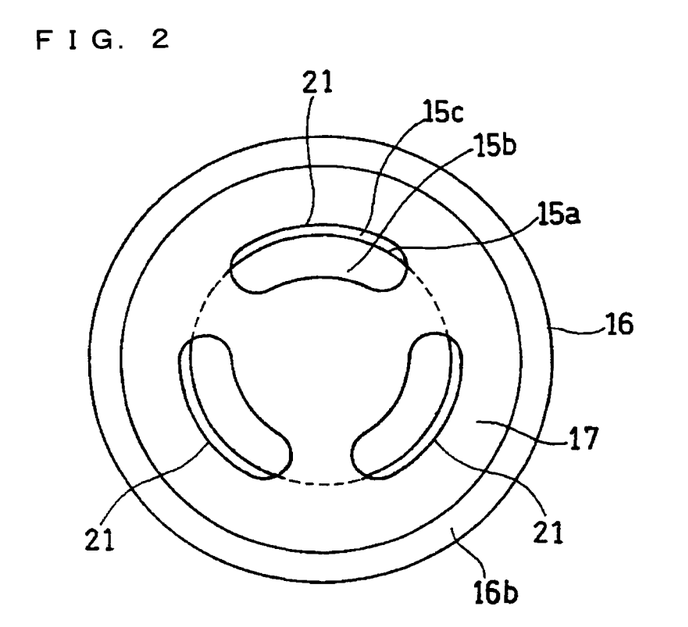
FIG. 2 is a bottom view of a seal assembly of the cylindrical battery of Embodiment 1.

Referring now to FIG. 2, the bottom plate 16 is described in more details. FIG. 2 is a bottom view of the seal assembly.

As illustrated therein, the bottom plate 16 of the seal assembly 5 has a predetermined number (three in the illustrated example) of inner gas vent holes 21. When the inner gas vent holes 21 are viewed from the axial direction of the battery case 1, a part of each of the inner gas vent holes 21 overlaps the valve-hole forming portion 15b of the lower valve plate 15, with the remaining part overlapping an outer portion 15c of the lower valve plate 15. Each of the inner gas vent holes 21 is an elongate hole which curves along the fragile portion 15a of the lower valve plate 15.

The following describes the operation of the safety mechanism of the battery 1 for releasing the gas inside the battery case 1 reliably when the internal pressure of the battery increases abnormally.

When the internal pressure of the battery increases abnormally for some reason, the fragile portions 13a and 15a of the upper valve plate 13 and the lower valve plate 15 rupture, so that a valve hole (not shown) is formed in the upper valve plate 13 and the lower valve plate 15. As a result, the gas inside the battery case 1 is released to the outside of the battery case 1 by passing through the inner gas vent holes 21 of the bottom plate 16, the valve hole of the upper valve plate 13 and the lower valve plate 15, and the outer gas vent holes 22 of the terminal plate 11. In this way, accidents due to an abnormal increase in the internal pressure of the battery are prevented.

However, when the internal pressure of the battery increases very sharply, the electrode assembly 20 may be pushed up, thereby pressing the bottom portion 17 against the lower valve plate 15. In the case of conventional batteries, if the bottom portion 17 is pressed against the lower valve plate 15, the bottom portion 17 may close the valve hole formed in the upper valve plate 13 and the lower valve plate 15, so that the gas inside the battery case 1 may not be promptly released to the outside.

Contrary to this, according to the invention, the inner gas vent holes 21 are formed in the bottom plate 16 so that when viewed from the axial direction of the battery case 1, at least a part thereof overlaps the valve-hole forming portions 13b and 15b of the upper valve plate 13 and the lower valve plate 15. It is thus possible to prevent the valve holes of the upper valve plate 13 and the lower valve plate 15 from being completely closed by the bottom portion 17. It is therefore possible to secure a passage through which the gas inside the battery case 1 is released. As such, the safety of the battery can be improved.

The proportion of the sum of the lengths of the parts of the fragile portion 15a of the lower valve plate 15 overlapping the inner gas vent holes 21 to the total length of the fragile portion 15a is preferably 50 to 80%.

Since the above proportion is 50% or more, even when the bottom portion 17 of the bottom plate 16 is pressed against the lower valve plate 15 while being shifted in the plane direction of the bottom portion 17, it is possible to prevent the valve hole from being completely closed. Also, since the above proportion is 80% or less, it is possible to avoid a decrease in the strength of the bottom portion 17.

Figure 3:
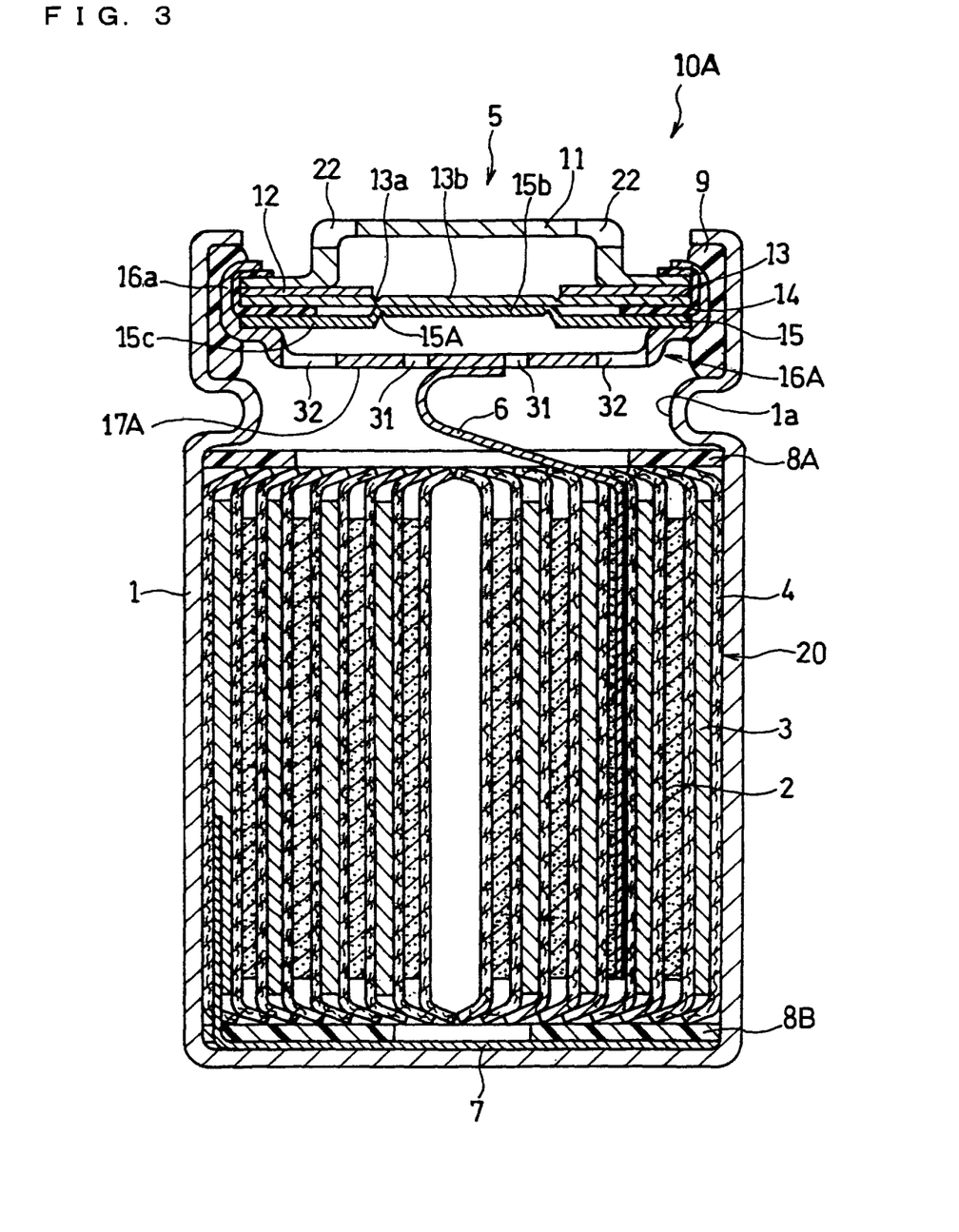
FIG. 3 is a sectional view of a modified example of the cylindrical battery of Embodiment 1.

FIG. 3 shows a modified example of the battery 1 of Embodiment 1.

In the battery 10 of FIG. 1, a part of each of the predetermined number of inner gas vent holes 21 of the bottom plate 16 overlaps the valve-hole forming portion 15b of the lower valve plate 15 when viewed in the axial direction of the battery case 1. Contrary to this, a battery 10A of FIG. 3 has a predetermined number of inner gas vent holes 31 and 32 in a bottom plate 16A, and the inner gas vent holes 31 entirely overlap the valve-hole forming portion 15b of the lower valve plate 15, while the inner gas vent holes 32 do not overlap the valve-hole forming portion 15b. As a result, when a bottom portion 17A of the bottom plate 16A is pressed against the lower valve plate 15, it is possible to prevent the valve hole from being closed by the bottom portion 17A.

Figure 4:
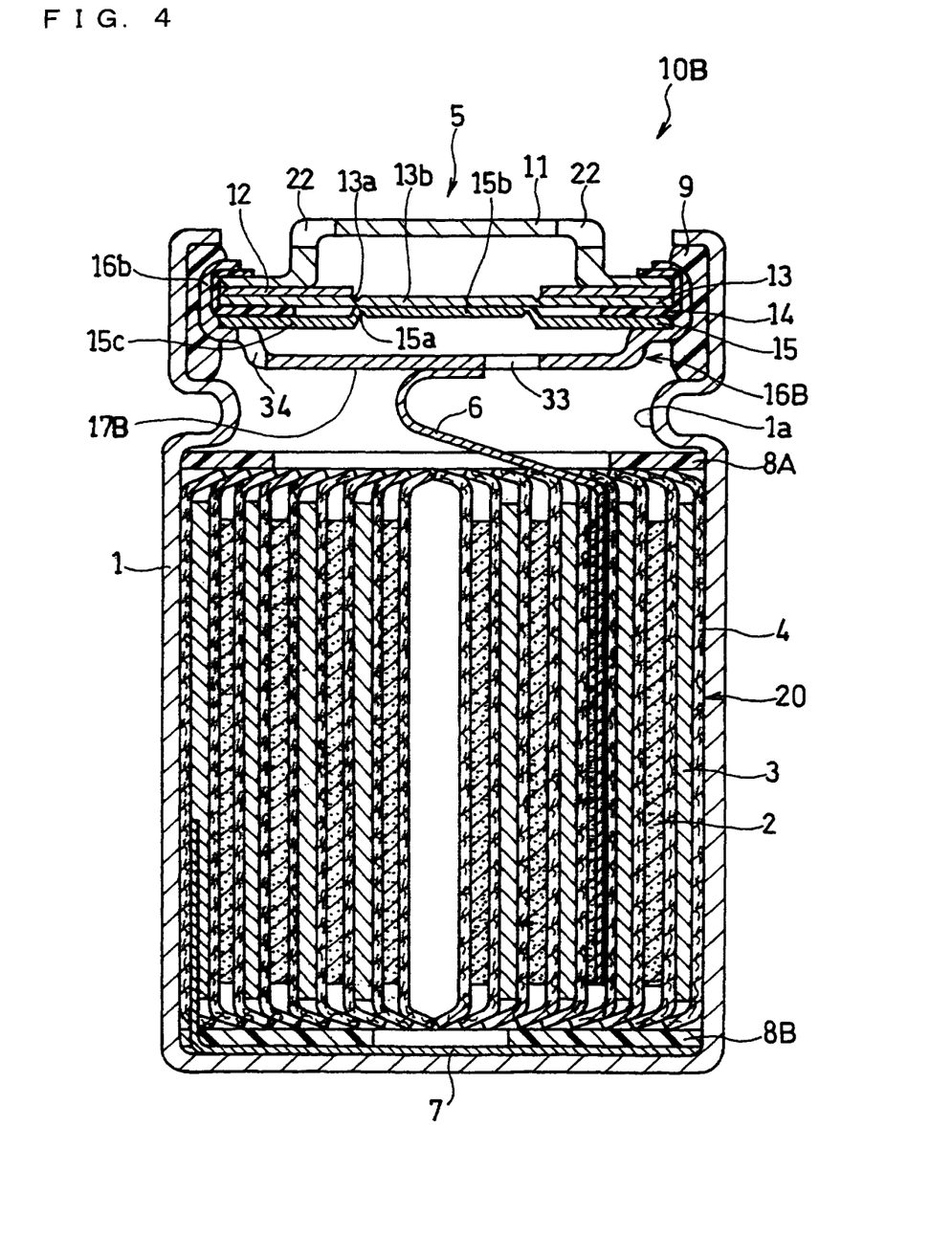
FIG. 4 is a sectional view of another modified example of the cylindrical battery of Embodiment 1.

FIG. 4 shows another modified example of the battery 1 of Embodiment 1.

A battery 10B of FIG. 4 has a predetermined number of inner gas vent holes 33 and 34 in a bottom plate 16B, and the inner gas vent hole 33 partially overlaps the valve-hole forming portion 15b of the lower valve plate 15 when viewed in the axial direction of the battery case 1, while the inner gas vent hole 34 does not overlap the valve-hole forming portion 15b. As a result, when a bottom portion 17B of the bottom plate 16B is pressed against the lower valve plate 15, it is possible to prevent the valve hole from being closed by the bottom portion 17B.

Also, in the battery 10B of FIG. 4, the length of the fragile portion 15a overlapping the inner gas vent hole 33 is less than 50%.

As can be understood from the above-described modified examples, in the battery of Embodiment 1, of the inner gas vent holes of the bottom plate of the seal assembly, at least a part of at least one inner gas vent hole overlaps the valve-hole forming portion of the lower valve plate. Also, the arrangement of the gas vent holes and the ratio of the gas vent holes to the bottom plate (the length overlapping the fragile portion) are not basically limited. However, the arrangement and ratio of the inner gas vent holes as illustrated in FIG. 2 can improve the battery safety most reliably.

Further, the number of the inner gas vent holes of the bottom plate may be one, or may be two or more.

Examples of the invention according to Embodiment 1 are hereinafter described. The invention is not to be construed as being limited to the following Examples.

Example 1

A test sample comprising a lithium ion secondary battery was produced as follows.
(Preparation of Positive Electrode)

Lithium cobaltate ($LiCoO_2$) with a mean particle size of 10 μm was used as a positive electrode active material. A positive electrode mixture paste was prepared by mixing 100 parts by weight of the positive electrode active material with 8 parts by weight of polyvinylidene fluoride (PVDF) serving as a binder, 3 parts by weight of acetylene black as a conductive agent, and a suitable amount of N-methyl-2-pyrrolidone (NMP).

The positive electrode mixture paste was applied onto both faces of a positive electrode current collector comprising aluminum foil excluding the connection area for the positive electrode lead 6, and dried to form positive electrode mixture layers. A positive electrode precursor thus prepared was rolled to obtain a positive electrode. At this time, the positive electrode precursor was rolled so that the positive electrode mixture layer on each face of the current collector was 70 µm in thickness.

Also, the aluminum foil used as the positive electrode current collector had a length of 600 mm, a width of 54 mm, and a thickness of 20 µm. Also, the connection area for the positive electrode lead 6 was provided in the initially wound portion of the positive electrode, as described below.

(Preparation of Negative Electrode)

Artificial graphite with a mean particle size of 20 µm was used as a negative electrode active material. A negative electrode mixture paste was prepared by mixing 100 parts by weight of the negative electrode active material with 1 part by weight of styrene butadiene rubber serving as a binder, 1 part by weight of carboxymethyl cellulose as a thickener, and a suitable amount of water.

The negative electrode mixture paste was applied onto both faces of a negative electrode current collector comprising copper foil excluding the connection area for the negative electrode lead 7, and dried to form negative electrode mixture layers. A negative electrode precursor thus prepared was rolled to obtain a negative electrode. At this time, the negative electrode precursor was rolled so that the negative electrode mixture layer on each face of the current collector was 65 µm in thickness.

Also, the copper foil used as the negative electrode current collector had a length of 630 mm, a width of 56 mm, and a thickness of 10 µm. Also, the connection area for the negative electrode lead 7 was provided in the finally wound portion of the negative electrode.

(Preparation of Seal Assembly)

The seal assembly 5 illustrated in FIG. 1 was prepared. The upper valve plate 13 and the lower valve plate 15 were made of aluminum. The terminal plate 11 was made of iron. The bottom plate 16 was made of aluminum. The gasket 14 for the assembly was made of polypropylene. With respect to the shape of the inner gas vent holes 21 of the bottom plate 16 when viewed from the axial direction of the battery case 1 (hereinafter referred to as projected shape), the inner portion of the projected shape overlapped the valve-hole forming portion 15b of the lower valve plate 15, while the outer portion overlapped the portion outside the fragile portion 15a of the lower valve plate 15.

(Assembly of Battery)

The positive electrode and the negative electrode prepared in the above manner were laminated with the separator 4 interposed therebetween, to obtain a laminate. The separator 4 was a 20-µm thick porous film made of polyethylene. The positive electrode lead 6 was connected to the initially wound portion of the positive electrode included in the laminate, while the negative electrode lead 7 was connected to the finally wound portion of the negative electrode. The positive electrode lead 6 and the negative electrode lead 7 were connected to the above-mentioned connection portions by ultrasonic welding. In this state, the laminate was spirally wound to obtain the electrode assembly 20.

The electrode assembly 20 was placed in the battery case 1 made of iron. At this time, the positive electrode lead 6 was laser welded to the bottom plate 16 of the seal assembly 5 whose edge was fitted with the polypropylene gasket 9, while the negative electrode lead 7 was resistance welded to the bottom of the battery case 1. The battery case 1 had a diameter (outer diameter) of 18 mm, a height of 65 mm, and a can wall thickness of 0.15 mm. The thickness of the battery case 1 is close to the thickness of commercially available battery cases for cylindrical lithium ion secondary batteries. Also, the upper and lower parts of the electrode assembly 20 were fitted with the upper insulator plate 8A and the lower insulator plate 8B, which were made of polypropylene, respectively. Also, a groove was formed in the side wall of the battery case 1 near the bottom to provide a portion subject to crack.

Thereafter, a non-aqueous electrolyte was injected into the battery case 1. The non-aqueous electrolyte was prepared by dissolving lithium hexafluorophosphate ($LiPF_6$) at a concentration of 1.0 mol/L in a solvent mixture of ethylene carbonate and ethyl methyl carbonate in volume ratio of 1:1.

Subsequently, at a position 5 mm from the open edge of the battery case 1, a protrusion 1a (see FIG. 1) was formed which protruded inward along the circumference of the battery case 1. In this way, the electrode assembly 20 was secured in the battery case 1.

Thereafter, the seal assembly 5 was fitted to the opening of the battery case 1 so as to be mounted on the protrusion 1a. The opening of the battery case 1 was then bent and crimped inward to seal the battery case 1.

In the above-described manner, 10 test samples were produced which were cylindrical lithium ion secondary batteries with a diameter of 18 mm and a height of 65 mm. The lithium ion secondary batteries had a design capacity of 2600 mAh.

Example 2

Ten test samples of lithium ion secondary batteries were produced in the same manner as in Example 1 except for the use of a battery case 1 with a can wall thickness of 0.12 mm.

Example 3

Ten test samples of lithium ion secondary batteries were produced in the same manner as in Example 1 except for the use of a battery case 1 with a can wall thickness of 0.10 mm.

Comparative Example 1

Ten test samples of lithium ion secondary batteries were produced in the same manner as in Example 3, except that the bottom plate of the seal assembly was provided with gas vent holes whose projected shape did not overlap the valve-hole forming portion 15b of the lower valve plate 15 (see FIG. 6).

The ten test samples of each of Examples 1 to 3 and Comparative Example 1 were tested in the following manner. First, in an environment of 25° C., they were charged at a constant current of 1500 mA until the battery voltage reached 4.25 V. The charged test samples were placed on a hot plate, and heated from 25° C. to 200° C. in such a manner that their temperature increased by 1° C. per second. The number of test samples with a small crack in the battery case 1 was counted.

The above results are shown in Table 1.

TABLE 1

| | Thickness of battery case (mm) | Number of test samples with a crack |
|---|---|---|
| Example 1 | 0.15 | 0 |
| Example 2 | 0.12 | 0 |
| Example 3 | 0.10 | 0 |
| Comparative Example 1 | 0.10 | 3 |

As shown in Table 1, the test samples of Examples 1 to 3 developed no cracks. This is because in Examples 1 to 3, at least a part of the projected shape of at least one inner gas vent hole 21 of the bottom plate 16 overlaps the valve-hole forming portion 15b of the lower valve plate 15. It is thus thought that even when the bottom portion 17 was pressed against the lower valve plate 15 by increased internal pressure of the battery, the valve hole formed in the lower valve plate 15 was not totally closed by the bottom portion 17. As such, even when the battery case 1 was made significantly thinner than conventional one (see Example 1) as in Example 3, no cracks occurred.

Contrary to this, three test samples of Comparative Example 1 cracked. This is probably because in these test samples, when the bottom portion 17 was pressed against the lower valve plate 15 by increased internal pressure of the battery, the valve hole formed in the lower valve plate 15 was closed by the bottom portion 17 and the internal pressure of the battery became excessive.

The result of Comparative Example 1 can be ascribed to the fact that the battery case 1 was made significantly thinner than conventional one. However, even when the battery case 1 has a conventional thickness, there is a possibility that some of thousands of, tens of thousands of, or hundreds of thousands of batteries may crack in the same manner as in Comparative Example 1.

Therefore, the above results indicate that the invention can improve battery safety.

Embodiment 2

Figure 5:
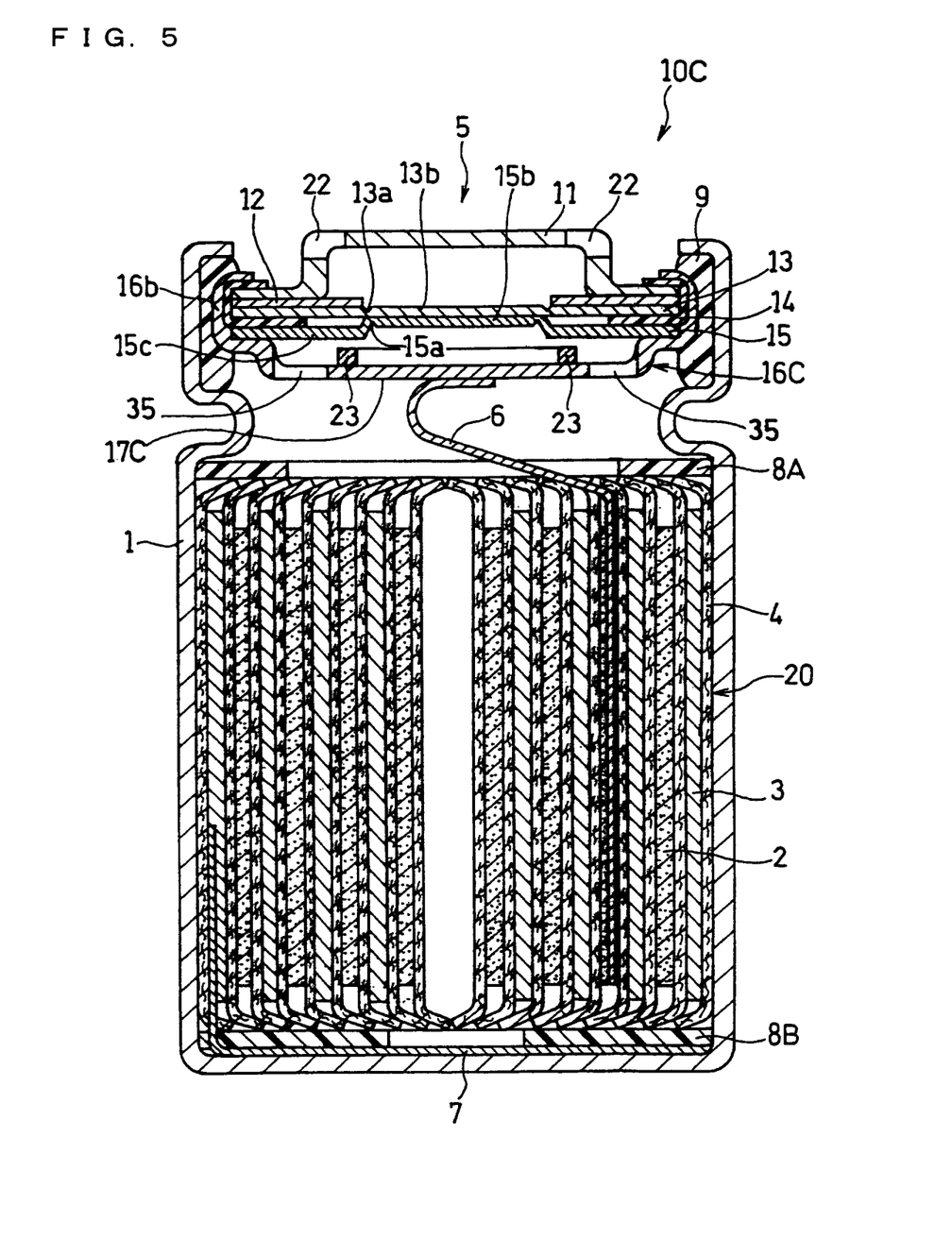
FIG. 5 is a sectional view schematically showing the structure of a cylindrical battery according to Embodiment 2 of the invention.

Next, Embodiment 2 of the invention is described. FIG. 5 is a sectional view schematically showing the structure of a battery according to Embodiment 2. Since Embodiment 2 is a modification of Embodiment 1, the difference from Embodiment 1 is mainly described below.

In Embodiment 2, as illustrated in FIG. 5, inner gas vent holes 35 of a bottom plate 16C do not overlap the valve-hole forming portion 15b of the lower valve plate 15. However, the bottom plate 16C has protrusions 23 which are to come into contact with the outer portion 15c of the lower valve plate 15 when a bottom portion 17C is pressed against the lower valve plate 15. The protrusions 23 prevent the valve hole of the lower valve plate 15 from being closed by the bottom portion 17C.

More specifically, in a battery 10C of FIG. 5, the protrusions 23 are formed on the bottom portion 17C at such positions that they face the outer portion 15c of the lower valve plate 15. The protrusions 23 at such positions can provide space between the bottom portion 17C and the lower valve plate 15 even when the bottom portion 17C is pressed against the lower valve plate 15. It is thus possible to prevent the valve hole formed in the lower valve plate 15 from being closed by the bottom portion 17C. In addition to the formation of the protrusions 23 on the bottom portion 17C, it is also possible to form, in the bottom portion 17C, inner gas vent holes which overlap the valve-hole forming portion 15b of the lower valve plate 15.

The protrusions 23 can be formed of a member different from the bottom portion 17C, as illustrated in FIG. 5. Also, the protrusions 23 and the bottom plate 16C can be formed integrally. The material thereof is not particularly limited if it has certain rigidity. The shape thereof may be annular or in the form of an independent protrusion. With respect to the number of independent protrusions, it is preferable to provide at least three protrusions in order to prevent the valve hole of the lower valve plate 15 from being closed by the bottom portion 17C in a more reliable manner.

As described above, by providing the protrusions 23 at such positions that the protrusions 23 are to come into contact with the outer portion 15c of the lower valve plate 15 when the bottom portion 17C is pressed against the lower valve plate 15, it is possible to prevent the valve hole of the lower valve plate 15 from being closed by the bottom portion 17C. Therefore, the safety of the cylindrical battery improves.

INDUSTRIAL APPLICABILITY

The invention can provide a cylindrical battery with improved safety. The cylindrical battery of the invention is particularly useful as the power source for portable electronic devices such as personal computers, cellular phones, mobile devices, personal digital assistants (PDA), portable game machines, and video cameras. It is also useful as the power source for assisting the motor of transportation vehicles such as hybrid cars, electric vehicles, and fuel cell vehicles. In addition, it is also useful as the power source for power tools, vacuum cleaners, and robots and the power source for plug-in HEVs.

REFERENCE SIGNS LIST

1 Battery case
5 Seal assembly
10, 10A, 10B, 10C Battery
11 Terminal plate
13 Upper valve plate
13a Fragile portion
13b Valve-hole forming portion
15 Lower valve plate
15a Fragile portion
15b Valve-hole forming portion
15c Outer portion
16, 16A, 16B, 16C Bottom plate
17, 17A, 17B, 17C Bottom portion
20 Electrode assembly
21, 31, 32, 33, 34, 35 Inner gas vent hole
22 Outer gas vent hole
23 Protrusion

The invention claimed is:
1. A cylindrical battery comprising:
a power generating element comprising a positive electrode being capable of absorbing and desorbing lithium ions and serving as one of the first electrode and the second electrode, a negative electrode being capable of absorbing and desorbing lithium ions and serving as the other one of the first electrode and the second electrode, a separator interposed between the positive electrode and the negative electrode, and a lithium-ion conductive non-aqueous electrolyte;

a cylindrical battery case with a bottom for housing the power generating element; and a seal assembly for sealing an opening of the battery case, the seal assembly including a terminal plate with an outer gas vent hole, a bottom plate with an inner gas vent hole, and at least one valve plate disposed between the terminal plate and the bottom plate, the bottom plate being circular, the terminal plate and the bottom plate being electrically connected via the valve plate, the valve plate being circular and concentric with the bottom plate, and having an annular fragile portion which will rupture when the internal pressure of the battery increases so that a valve hole opens up in a portion of the valve plate at a center thereof, wherein the bottom plate has a plurality of the inner gas vent holes, and when the inner gas vent holes are viewed from the axial direction of the battery case, only a part of each of the inner gas vent holes overlaps the portion of the valve plate in which the valve hole is to open up, and 50 to 80% of the total length of the annular fragile portion overlaps the inner gas vent holes such that the valve hole and the inner gas vent holes overlap with each other when viewed in the axial direction when the bottom plate is pushed upwardly by the power generating element into the valve plate, so as to allow gas inside said cylindrical battery case to be released to outside of said cylindrical battery case when the valve hole is opened.

2. A cylindrical battery comprising:

a power generating element;

a cylindrical battery case with a bottom for housing the power generating element; and a seal assembly for sealing an opening of the battery case, the seal assembly including a terminal plate with an outer gas vent hole, a bottom plate with an inner gas vent hole, and at least one valve plate disposed between the terminal plate and the bottom plate, the bottom plate being circular, the power generating element including a first electrode and a second electrode, the terminal plate and the bottom plate being electrically connected via the valve plate, the valve plate being circular and concentric with the bottom plate, and having an annular fragile portion which will rupture when the internal pressure of the battery increases so that a valve hole opens up in a portion of the valve plate at a center thereof, wherein when the inner gas vent holes are viewed from the axial direction of the battery case, only a part of at least one of the inner gas vent holes overlaps the portion of the valve plate in which the valve hole is to open up, and greater than 0 and less than 50% of the total length of the annular fragile portion overlaps the at least one of the inner gas vent holes, such that the valve hole and the at least one inner gas vent hole overlap with each other when viewed in the axial direction when the bottom plate is pushed upwardly by the power generating element into the valve plate, while the other inner gas vent hole or holes entirely overlap a portion of the bottom plate which is outside the fragile portion, so as to allow gas inside said cylindrical battery case to be released to outside of said cylindrical battery case when the valve hole is opened.

3. A cylindrical battery comprising:

a power generating element;

a cylindrical battery case with a bottom for housing the power generating element; and a seal assembly for sealing an opening of the battery case, the seal assembly including a terminal plate with an outer gas vent hole, a bottom plate with an inner gas vent hole, and at least one valve plate disposed between the terminal plate and the bottom plate, the bottom plate being circular, the power generating element including a first electrode and a second electrode, the terminal plate and the bottom plate being electrically connected via the valve plate, the valve plate being circular and concentric with the bottom plate, and having an annular fragile portion which will rupture when the internal pressure of the battery increases so that a valve hole opens up in a portion of the valve plate at a center thereof, wherein the bottom plate has an independent protrusion protruding from the bottom plate toward the valve plate, the protrusion being provided on a surface facing the valve plate of the bottom plate, and when the protrusion is viewed from the axial direction of the battery case, the position of the protrusion overlaps a portion of the bottom plate which is outside the fragile portion, and at least part of a portion of the valve plate which is inside the fragile portion does not overlap the position of the protrusion such that the protrusion contacts the valve plate when the bottom plate is pushed upwardly by the power generating element into the valve plate and prevents the bottom plate from sealing the valve hole, so as to allow gas inside said cylindrical battery case to be released to outside of said cylindrical battery case when the valve hole is opened.

4. The cylindrical battery in accordance with claim 1, wherein the positive electrode includes a positive electrode active material and a current collector comprising metal foil, and the positive electrode active material comprises a lithium-containing transition metal oxide.

5. The cylindrical battery in accordance with claim 1, wherein the negative electrode includes a negative electrode active material and a current collector comprising metal foil, and the negative electrode active material comprises a carbonaceous material.

6. The cylindrical battery in accordance with claim 1, wherein the valve plate includes an upper valve plate and a lower valve plate, a peripheral portion of the lower valve plate and a peripheral portion of the bottom plate are in contact with each other, a center portion of the lower valve plate and a center portion of the upper valve plate are in contact with each other, and the lead-connection area of the bottom plate overlaps the portion of the valve plate in which the valve hole is to open up.

* * * * *